United States Patent
Zhang et al.

(10) Patent No.: US 11,596,016 B2
(45) Date of Patent: Feb. 28, 2023

(54) ENHANCING LATENCY AND THROUGHPUT IN LTE AND IN AN ASYMMETRIC EN-DC CONFIGURATION

(71) Applicant: Apple Inc., Cupertino, CA (US)

(72) Inventors: Dawei Zhang, Saratoga, CA (US); Fangli Xu, Beijing (CN); Haijing Hu, Beijing (CN); Longda Xing, San Jose, CA (US); Murtaza A. Shikari, Mountain View, CA (US); Sethuraman Gurumoorthy, San Jose, CA (US); Sree Ram Kodali, Sunnyvale, CA (US); Srinivasan Nimmala, San Jose, CA (US); Srirang A. Lovlekar, Cupertino, CA (US); Xu Ou, San Jose, CA (US); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 799 days.

(21) Appl. No.: 16/336,456

(22) PCT Filed: Apr. 6, 2018

(86) PCT No.: PCT/CN2018/082090
§ 371 (c)(1),
(2) Date: Mar. 25, 2019

(87) PCT Pub. No.: WO2019/192014
PCT Pub. Date: Oct. 10, 2019

(65) Prior Publication Data
US 2021/0337619 A1    Oct. 28, 2021

(51) Int. Cl.
*H04W 76/25*    (2018.01)
*H04W 76/10*    (2018.01)
(Continued)

(52) U.S. Cl.
CPC ............ *H04W 76/25* (2018.02); *H04L 5/001* (2013.01); *H04W 28/065* (2013.01);
(Continued)

(58) Field of Classification Search
CPC ... H04W 76/25; H04W 28/065; H04W 80/02; H04W 80/04; H04W 36/0069;
(Continued)

(56) References Cited

U.S. PATENT DOCUMENTS

2008/0076359 A1* 3/2008 Charpentier .......... H04W 24/00
                                                                    455/63.1
2009/0149189 A1* 6/2009 Sammour ............... H04L 1/165
                                                                    455/450

(Continued)

FOREIGN PATENT DOCUMENTS

CN          104935414 A      9/2015
WO     WO 2015113497 A1      8/2015

OTHER PUBLICATIONS

International Preliminary Report on Patentability in application No. PCT/CN2018/082090 dated Jul. 7, 2020, 5 pages.
(Continued)

*Primary Examiner* — Hassan A Phillips
*Assistant Examiner* — Prenell P Jones
(74) *Attorney, Agent, or Firm* — Kowert, Hood, Munyon, Rankin & Goetzel, P.C.

(57) ABSTRACT

Apparatuses, systems, and methods for a wireless device to perform a method including a user equipment device (UE) receiving from a network entity, a configuration message, wherein the configuration message includes a parameter specifying out-of-order delivery of data units from lower layers to upper layers of a protocol stack implemented on the UE, configuring a radio link control (RLC) layer of a protocol stack for out-of-order delivery based on the
(Continued)

received configuration message, and notifying the network entity of the configuration of the RLC layer.

20 Claims, 14 Drawing Sheets

(51) Int. Cl.
  *H04W 36/00*    (2009.01)
  *H04L 5/00*     (2006.01)
  *H04W 28/06*    (2009.01)
  *H04W 80/02*    (2009.01)
(52) U.S. Cl.
  CPC ....... *H04W 36/0069* (2018.08); *H04W 76/10* (2018.02); *H04W 80/02* (2013.01)
(58) Field of Classification Search
  CPC ..... H04W 76/10; H04W 84/12; H04W 88/06; H04W 88/08; H04W 84/18; H04L 5/001
  See application file for complete search history.

(56) References Cited

U.S. PATENT DOCUMENTS

| | | | | |
|---|---|---|---|---|
| 2011/0134831 | A1* | 6/2011 | Pirskanen | H04L 5/001 370/328 |
| 2013/0088979 | A1* | 4/2013 | Bi | H04W 68/00 370/252 |
| 2014/0177448 | A1* | 6/2014 | Wu | H04W 28/18 370/237 |
| 2015/0043492 | A1* | 2/2015 | Baek | H04W 76/15 370/329 |
| 2016/0113058 | A1* | 4/2016 | Jung | H04L 47/34 370/328 |
| 2017/0041767 | A1* | 2/2017 | Vajapeyam | H04L 47/34 |
| 2017/0064707 | A1 | 3/2017 | Xiao et al. | |
| 2017/0099658 | A1* | 4/2017 | Shattil | H04L 63/061 |
| 2017/0245252 | A1* | 8/2017 | Gao | H04W 76/15 |
| 2017/0295178 | A1* | 10/2017 | Cheng | H04W 76/14 |
| 2017/0331577 | A1* | 11/2017 | Parkvall | H04B 7/0452 |
| 2018/0098250 | A1* | 4/2018 | Vrzic | H04W 36/18 |
| 2018/0102879 | A1* | 4/2018 | Gholmieh | H04W 28/06 |
| 2018/0103395 | A1* | 4/2018 | Gholmieh | H04L 1/1867 |
| 2018/0124642 | A1* | 5/2018 | Phuyal | H04W 80/02 |
| 2018/0255488 | A1* | 9/2018 | Kim | H04W 76/16 |
| 2018/0287764 | A1* | 10/2018 | Hosseini | H04L 5/0055 |
| 2018/0352468 | A1* | 12/2018 | Futaki | H04L 29/04 |
| 2019/0045404 | A1* | 2/2019 | Tsai | H04W 36/0022 |
| 2019/0075438 | A1* | 3/2019 | Kuo | H04W 4/70 |
| 2019/0150162 | A1* | 5/2019 | Tang | H04W 80/08 370/329 |
| 2019/0200381 | A1* | 6/2019 | Wu | H04L 1/1664 |
| 2019/0274121 | A1* | 9/2019 | Wu | H04W 72/1284 |
| 2019/0349822 | A1* | 11/2019 | Kim | H04W 76/10 |
| 2020/0059823 | A1* | 2/2020 | Lee | H04W 28/065 |
| 2020/0170061 | A1* | 5/2020 | Richards | H04W 28/18 |
| 2020/0196374 | A1* | 6/2020 | Lim | H04W 76/27 |
| 2020/0295881 | A1* | 9/2020 | Jo | H04W 24/10 |
| 2020/0304958 | A1* | 9/2020 | Xu | H04W 4/06 |

OTHER PUBLICATIONS

Ericsson; "Running CR for introduction of Ultra Reliable Low Latency Communication for LTE"; R2-1802727; 3GPP TSG-RAN2 Meeting #101; Feb. 15, 2018; 16 pages.
Ericsson; "PDCP duplication in LTE"; R2-1802714; 3GPP TSG RAN WG2 #101; Feb. 15, 2018; 5 pages.
Extended European Search Report for EP Patent Application No. 18913299.6-1213; dated Nov. 9, 2021.

* cited by examiner

ENHANCING LATENCY AND THROUGHPUT IN LTE AND IN AN ASYMMETRIC EN-DC CONFIGURATION

FIELD

The present application relates to wireless devices, and more particularly to apparatus, systems, and methods for enhancing latency and throughput in an asymmetric E-UTRAN New Radio-dual connectivity (EN-DC) configuration and/or in an LTE DC configuration.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from media access control (MAC) and higher layers. LTE also defines a number of physical layer channels for the uplink (UL).

For example, LTE defines a Physical Downlink Shared Channel (PDSCH) as a DL physical channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of the less restrictive UE scheduling.

SUMMARY

Embodiments relate to apparatuses, systems, and methods for enhancing latency and throughput in asymmetric EN-DC configuration and/or in an LTE DC configuration.

In some embodiments, a user equipment device may be configured to perform a method including receiving from a network entity, a configuration message, wherein the configuration message includes a parameter specifying out-of-order delivery of data units from lower layers to upper layers of a protocol stack implemented on the UE, configuring a radio link control (RLC) layer of a protocol stack for out-of-order delivery based on the received configuration message, and notifying the network entity of the configuration of the RLC layer.

In some embodiments, a UE may be configured via radio resource control (RRC) signaling for dual connectivity with a master cell and a secondary cell, and may be configured to receive, from the master cell, a configuration message indicating a configuration of the UE for out-of-order delivery of data units from a RLC layer of a first protocol stack implemented on the UE. The UE may be configured to configure a first capability of the RLC layer of the first protocol stack based on the configuration message, the first capability being associated with out-of-order delivery of data units transmitted from the RLC Receive entity to its higher layer. Further, the UE may be configured to notify the master cell of the configuration of the RLC layer.

In some embodiments, a UE may be configured to maintain substantially concurrent connections with a master cell configured to operate according to a first RAT and a secondary cell configured to operate according to a second RAT, e.g., the UE may be configured for dual connectivity to a master cell and a secondary cell. The UE may be configured to receive, from the master cell, a RRC message indicating configuration of a RLC layer of a first protocol stack paired with a packet data control protocol (PDCP) layer of a second protocol stack. The PDCP layer of the second protocol stack may be configured to communicate with the master cell and the secondary cell via a split bearer. The UE may be configured to determine, based on the RRC message, a configuration of the RLC layer of the first protocol stack for out-of-order delivery of data packets to the PDCP layer of the second protocol stack and to configure a capability of the RLC layer of the first protocol stack associated with out-of-order-delivery of data packets to the PDCP layer of the second protocol stack based on the determined configuration. Further, the UE may be configured to notify the master cell of the configuration of the RLC layer of the first protocol stack.

In some embodiments, a UE may be configured to determine that a PDCP layer of a second protocol stack, paired with an RLC layer of a first protocol stack, is configured for out-of-order delivery of data units (or packets). In addition, in response to determining the configuration of the PDCP layer, the UE may configure the RLC layer of the first protocol stack for out-of-order delivery of data units to higher layers. In other words, the UE may be configured to configure the RLC layer of the first protocol stack based on the configuration of the PDCP layer of the second protocol stack paired with the RLC layer. In some embodiments, the UE may be configured to indicate such a configuration to a master cell.

In some embodiments, a UE may be configured to determine a configuration of the RLC layer of the first protocol stack based on a proprietary implementation. Thus, irrespective of a configuration of a PDCP layer of a second protocol stack paired with the RLC layer, the UE may chose (or determine), based on the proprietary implementation, to configure the RLC layer for out-of-order delivery of data units to higher layers.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
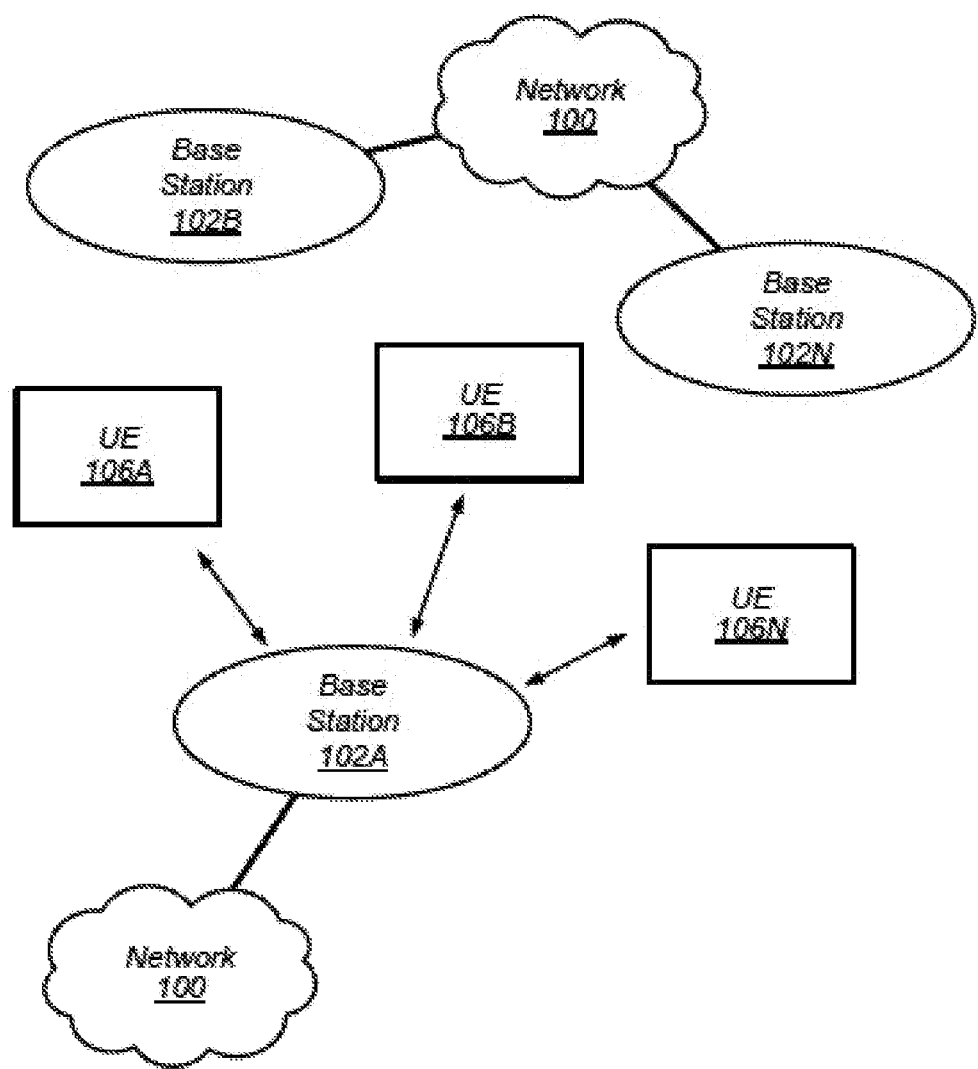
FIG. 1 illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
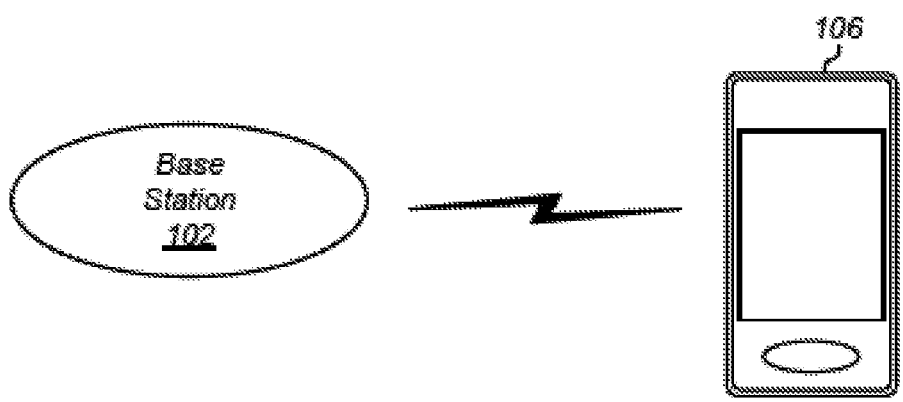
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM (GPRS, EDGE/EGPRS), UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network, e.g., a 5G core network (5GC). In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM (GPRS, EDGE/EGPRS), UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
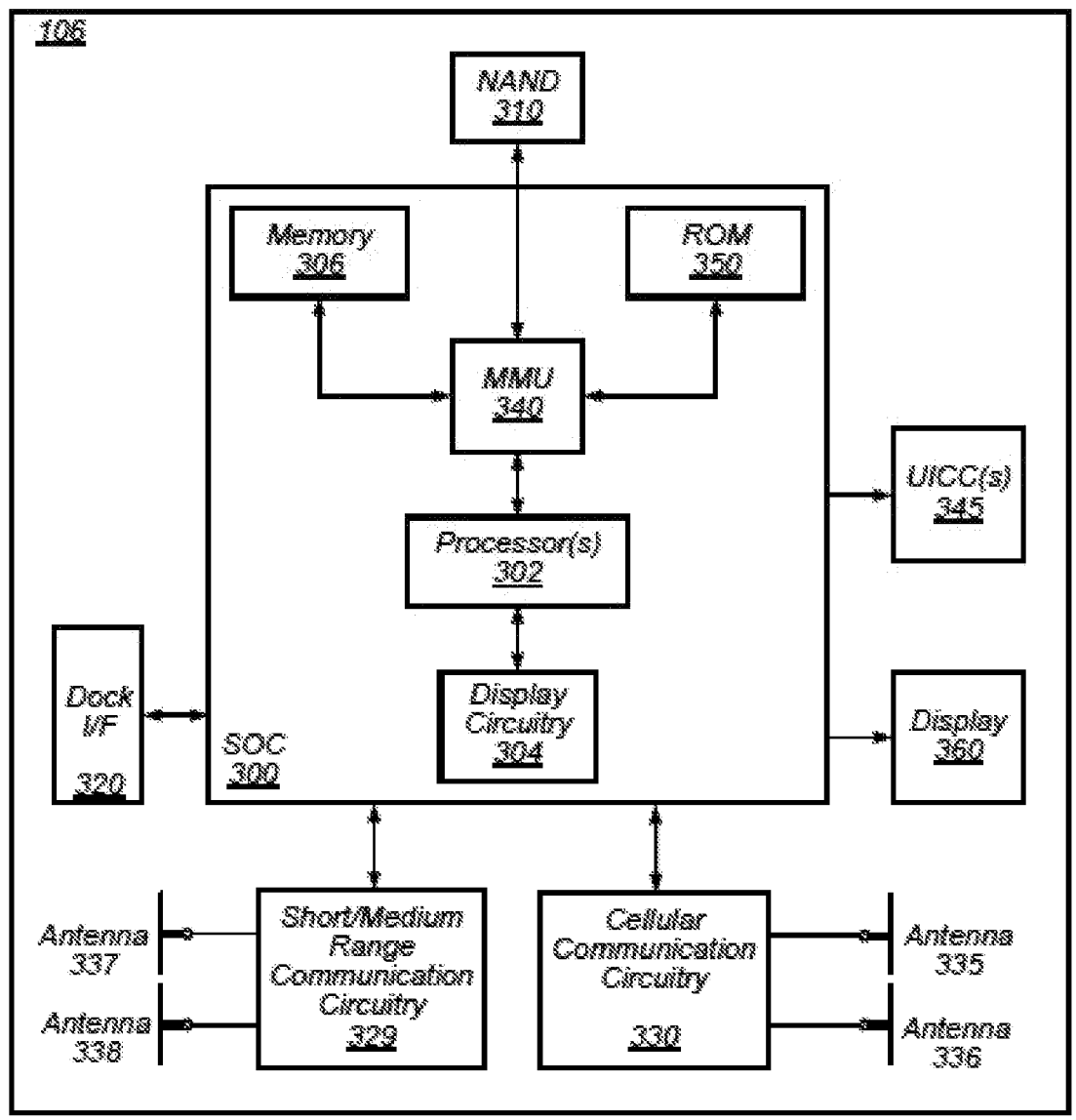
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform a method including, but not limited to, receiving from a network entity, a configuration message, wherein the configuration message includes a parameter specifying out-of-order delivery of data units from lower layers to upper layers of a protocol stack implemented on the UE, configuring a radio link control (RLC) layer of a protocol stack for out-of-order delivery based on the received configuration message, and notifying the network entity of the configuration of the RLC layer.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
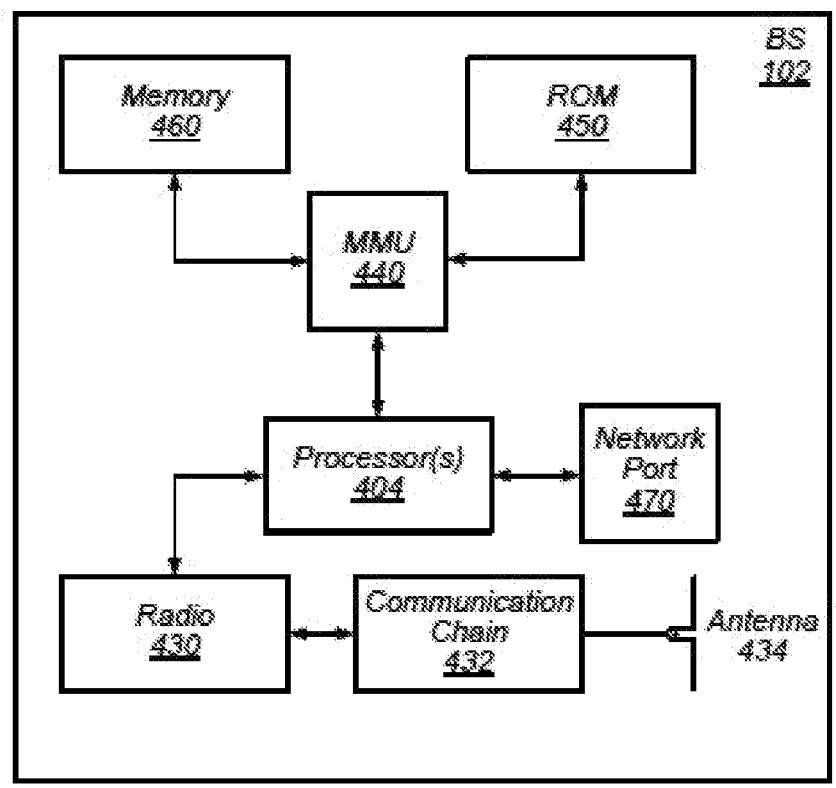
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
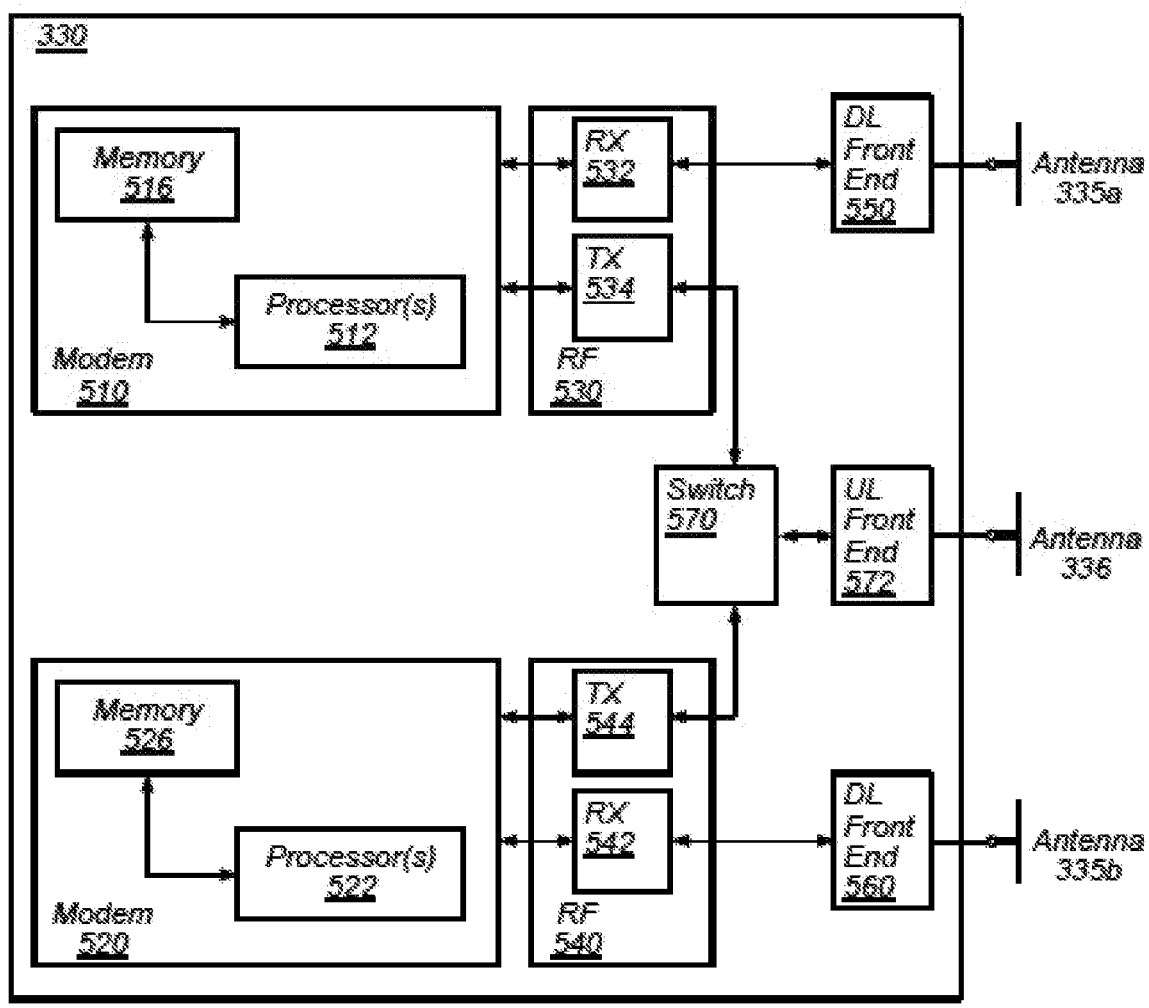
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform a method including, but not limited to, receiving from a network entity, a configuration message, wherein the configuration message includes a parameter specifying out-of-order delivery of data units from lower layers to upper layers of a protocol stack implemented on the UE, configuring a radio link control (RLC) layer of a protocol stack for out-of-order delivery based on the received configuration message, and notifying the network entity of the configuration of the RLC layer.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6:
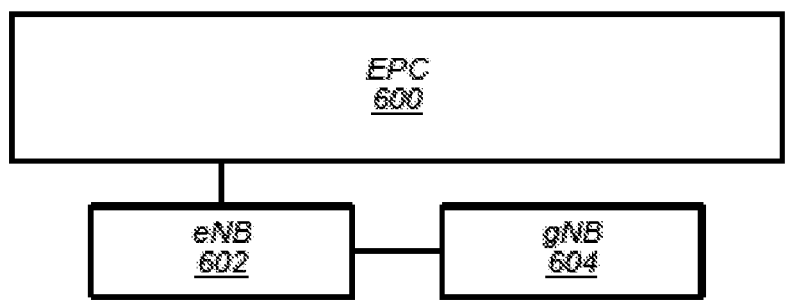
FIG. 6 illustrates an example of connections between a core network, an LTE base station (eNB), and a 5G NR base station (gNB).

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIG. 6, core network 600, which in some embodiments may be an evolved packet core (EPC) network and/or a 5G core (5GC) network, may continue to communicate with current LTE base stations (e.g., eNB 602). In addition, eNB 602 may be in communication with a 5G NR base station (e.g., gNB 604) and may pass data between the core network 600 and gNB 604. Thus, core network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

As described further subsequently herein, any or all of the core network 600, eNB 602, and/or gNB 604 may include hardware and/or software components for implementing or supporting implementation of features described herein. In some embodiments, one or more processors (and/or processing circuitry) of any or all of the core network 600, eNB 602, and/or gNB 604 may be configured to implement or support implementation of part or all of the methods described herein, e.g., by executing program instructions stored on a memory medium (e.g., a non-transitory computer-readable memory medium). In some embodiments, the processor (and/or processing circuitry) may be configured as a programmable hardware element, such as an FPGA (Field Programmable Gate Array), or as an ASIC (Application Specific Integrated Circuit), or a combination thereof. Alternatively (or in addition) the processor, in conjunction with one or more of the other components of any or all of the core network 600, eNB 602, and/or gNB 604, may be configured to implement or support implementation of part or all of the features described herein.

Figure 7A:
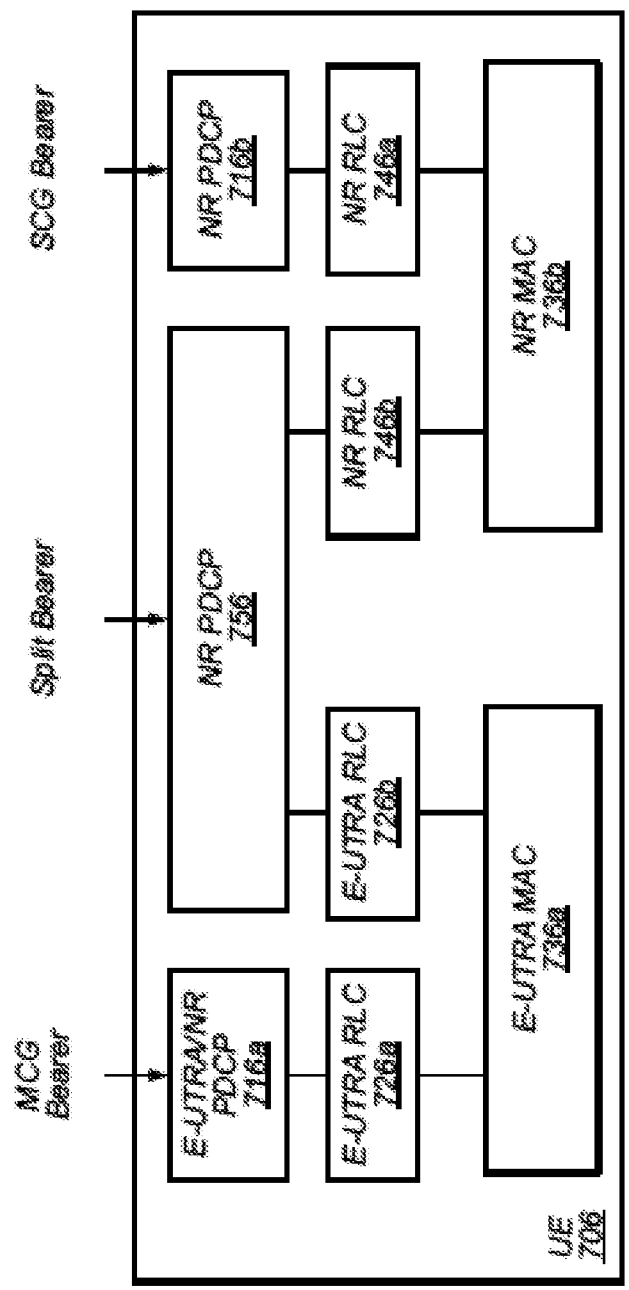
FIG. 7A illustrates an example configuration of a UE for dual connectivity, according to some embodiments.
Figure 7B:
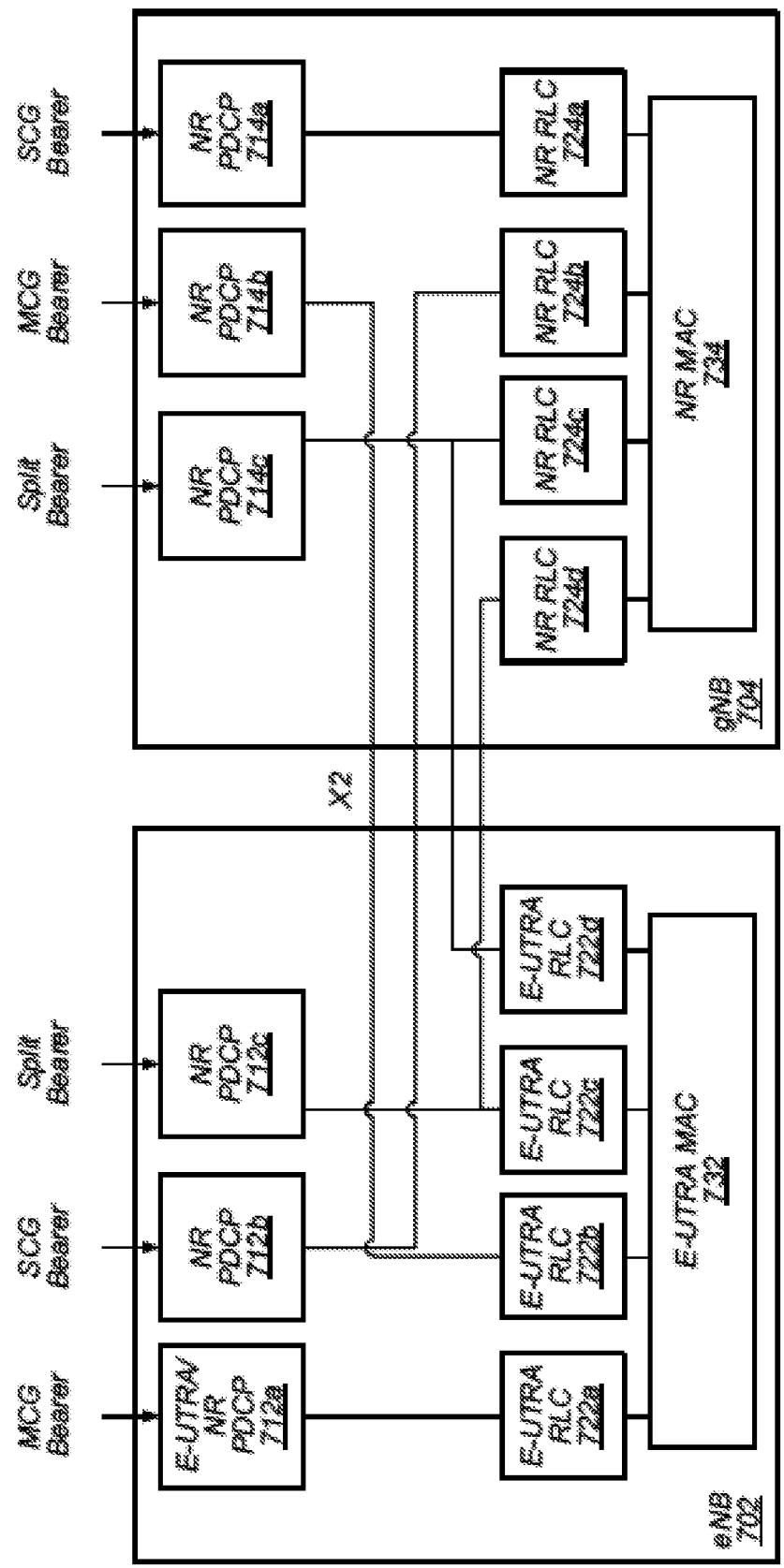
FIG. 7B illustrates another example of connections between an eNB and a gNB for dual connectivity, according to some embodiments.

FIGS. 7A-B illustrate a protocol stack for an eNB 702, a gNB 704, and a UE 706, according to some embodiments. Note that the protocol stack may be as defined in 3GPP TS 37.340 V15.1.0 and any or all of eNB 702, gNB 704, and/or UE 706 may include hardware and/or software components for implementing or supporting implementation of features described herein, according to some embodiments. In some embodiments, eNB 702 and/or gNB 704 may be a base station such as base station 102 described above. Further, in some embodiments, UE 706 may be a UE such as UE 106 described above. As shown in FIG. 7A, a UE 706 may include a E-UTRA (or E-UTRAN) medium access control (MAC) layer 736a and an NR MAC layer 736b. In addition, the E-UTRA MAC layer 736a may interface with radio link control (RLC) layers 726a-b. RLC layer 726a may interface with E-UTRA/NR packet data convergence protocol (PDCP) layer 716a which may communicate on the master cell group (MCG) bearer. NR MAC layer 726b may interface with NR RLC layers 746a-b. RLC layer 746a may interface with NR PDCP layer 716b which may communicate on the secondary cell group (SCG) bearer. Further, E-UTRA RLC layer 726b and NR RLC layer 746b may both interface with NR PDCP layer 756 which may communicate on the split bearer.

As shown in FIG. 7B, eNB 702 may include a MAC layer 732 that interfaces with E-UTRA RLC layers 722a-d. RLC layer 722a may interface with PDCP layer 712a which may communicate on the MCG bearer. RLC layer 722c may interface with NR PDCP layer 712c which may communicate on the split bearer. In other words, similar to dual connectivity as specified in LTE-Advanced Release 12, E-UTRA PDCP layer 712a may interface via the MCG bearer to a core network whereas NR PDCP layer 712c may interface via the split bearer with the core network.

Additionally, as shown, gNB 704 may include an NR MAC layer 734 that interfaces with NR RLC layers 724a-d. NR RLC layer 724a may interface with NR PDCP layer 714a which may communicate on the SCG bearer. In addition, NR RLC layer 724c may interface with NR PDCP layer 714c which may communicate on the split bearer. In other words, similar to dual connectivity as specified in LTE-Advanced Release 12, NR PDCP layer 714a may interface via the SCG bearer to the core network whereas NR PDCP layer 712c may interface via the split bearer with the core network.

In addition, eNB 702 and gNB 704 may interface via an X₂ interface for information exchange and/or coordination (e.g., scheduling of a UE) between eNB 702 and gNB 704. Thus, as shown, E-UTRA RLC layer 722b may interface with NR PDCP layer 714b which may communicate over the MCG bearer. Further, E-UTRA RLC layer 722d may interface with NR PDCP layer 712c which may communicate on the split bearer. Further, NR RLC layer 724b may interface with NR PDCP layer 712b which may also communicate on the SCG bearer. Similarly, NR RLC layer 724d may interface with NR PDCP layer 712c which may communicate on the SCG bearer. Thus, eNB 702 may be considered a master node (MeNB) while gNB 704 may be considered a secondary node (SgNB). In some scenarios, a UE may be required to maintain a connection to both an MeNB and a SgNB. In such scenarios, the MeNB may be used to maintain a radio resource control (RRC) connection to a core network, such as core network 600, while the SgNB may be used for capacity (e.g., additional downlink and/or uplink throughput).

Enhancing Latency and Throughput for Asymmetric EN-DC

In current implementations of LTE, in-order and two-level reordering functionalities for received data packets are supported. Thus, LTE provides in-order data packet delivery service to upper layers, e.g., reordering data packets that are received out of order at lower layers. This is due to the transmission control protocol (TCP) used in LTE, which is sensitive to out-of-sequence reception of data packets. Thus, the packet data convergence protocol (PDCP) of LTE has traditionally delivered packets in sequence to upper layers. Note that in LTE, PDCP reordering functionality is applicable for split data radio bearer (DRB) in LTE dual connectivity (DC), e.g., as specified in LTE-Advanced Release 12. In addition, radio link control (RLC) layer reordering functionality is always applicable for RLC acknowledged mode (AM) and unacknowledged mode (UM).

In current implementations of 5G NR, out of order delivery and single-level reordering functionalities for received data packets are supported. Note that reordering of data packets at lower layers may result in longer packet delivery latency to upper layers when the application does not require in-order delivery of data packets. In addition, when multiple layers have receive buffers (e.g., RLC and PDCP), only the highest layer receive buffers (e.g., PDCP) may be required to support in-order delivery of all data packets in order to provide in-order data packet delivery service. Further, some applications may require in-order data packet delivery, e.g. TCP applications, whereas some applications may not require in-order data packet delivery, e.g. VoIP applications. Additionally, newer versions of TCP may handle out-of-order (or out-of-sequence) reception of data packets in a better way, thus newer versions of TCP may be less sensitive to out-of-order reception of data packets. Further, allowing out-of-order delivery functionality for received data packets may improve latency (e.g., systems may have reduced latency as compared to current LTE), reduce processing (e.g., as compared to current LTE), and/or require less buffer overhead (e.g., as compared to current LTE).

As noted above, an E-UTRAN New Radio-dual connectivity (EN-DC) architecture may allow for tight interworking between LTE and 5G NR to ease initial 5G roll out. As part of this architecture, there may be scenarios in which the LTE RLC protocol stack layer is used in conjunction with 5G NR PDCP protocol stack layer for the master cell group (MCG) direct and split bearers on the user plane, e.g., as illustrated by FIGS. 7A-B. In some implementations, an LTE radio link control (RLC) layer operating in acknowledged mode (AM) may guarantee in-order delivery of data packets to its usually paired LTE packet data convergence protocol (PDCP) layer on the downlink. In addition, the LTE PDCP layer may not perform re-ordering of data packets as a result and may forward data to higher layers once the packet delivered from the RLC layer is deciphered correctly.

In contrast, NR RLC AM does not guarantee in-order delivery of data packets to the NR PDCP layer. Thus, the NR PDCP layer has added re-ordering logic and a timer protection to allow for missing data packets to be made available to its higher layers. In some implementations, if the reordering timer expires, the NR PDCP layer may go ahead and forward received data packets to higher layers. However, pairing the NR PDCP layer with the LTE RLC AM layer may cause a potential issue of slowing down the faster NR link due to redundant re-ordering/in-order guarantee logic in the slower (asymmetric) LTE RLC AM layer. In other words, in an EN-DC architecture, for split DRB, which is transmitted via both NR and LTE legs (e.g., as illustrated in FIGS. 7A-B), the two-level reordering structure on the LTE leg (or side) impacts transmission latency for both NR and LTE. Similarly, for an LTE evolution architecture (e.g., HRLLC or high reliability and low latency), the two-level reordering structure of LTE impacts transmission latency. Thus, embodiments are presented herein of mechanisms to allow LTE RLC layers to support out of order delivery of data packets and/or to allow LTE PDCP layers to support out of order delivery of data packets.

In some embodiments, a radio resource control (RRC) message may be implemented to configure a UE, such as UE 106, for LTE out-of-order delivery (OOD) of data packets. For example, in an EN-DC configuration, a EUTRA RLC AM layer (or entity) paired with an NR PDCP layer (or entity) in a multi-RAT EN-DC (MR EN-DC) may be allowed to bypass the EUTRA RLC AM layer's re-ordering functionality and in-order delivery guarantee. In some embodiments, the LTE (or E-UTRA) RLC layer may be configured for individual DRBs using an information element in an RRC configuration (or re-configuration) message. In some embodiments, the configuration may be explicit. In some embodiments, presence of the information element in a different protocol layer (e.g., an OutOfOrderDelivery (OOD) parameter or re-ordering timer value configured as zero in NR-PDCP layer) may indicate that the feature (e.g., bypass of re-ordering functionality and in-order delivery guarantee) is configured whereas absence of the information element may indicate that the DRB RLC layer may default to legacy LTE RLC layer behavior and guarantee in-order delivery to higher layers. In some embodiments, the LTE RLC layer, e.g., based (at least in part) on proprietary methods, may enable or disable this feature.

As further described below, a capability (e.g., an out-of-order delivery parameter) may be exchanged between a UE, such as UE 106, and a network (e.g., via a network node, such as base station 102) to support out-of-order delivery of data packets for DRB at an LTE RLC AM layer and/or an LTE PDCP layer. Alternatively, if there is no capability (e.g., an out-of-order delivery parameter) exchange defined for an out-of-order data packet delivery feature, the network may still configure the UE to support the out-of-order delivery feature. However, since there is no inter-operability impact, UEs that cannot support such operation within their LTE RLC AM layers can safely ignore this configuration. Further, although there may be no interoperability issue, it may be advantageous to indicate such a capability to the network as the network will then be able to make better scheduling decisions for optimal throughput and load balancing, e.g., if the network knows that the UE supports the out-of-order delivery feature then the network may route downlink (DL) protocol data units (PDUs) equally on the LTE and NR link; however, if the UE doesn't support out-of-order delivery, then the network may bias the routing decision on the faster link (e.g., NR leg rather than on the slower LTE leg).

Figure 8:
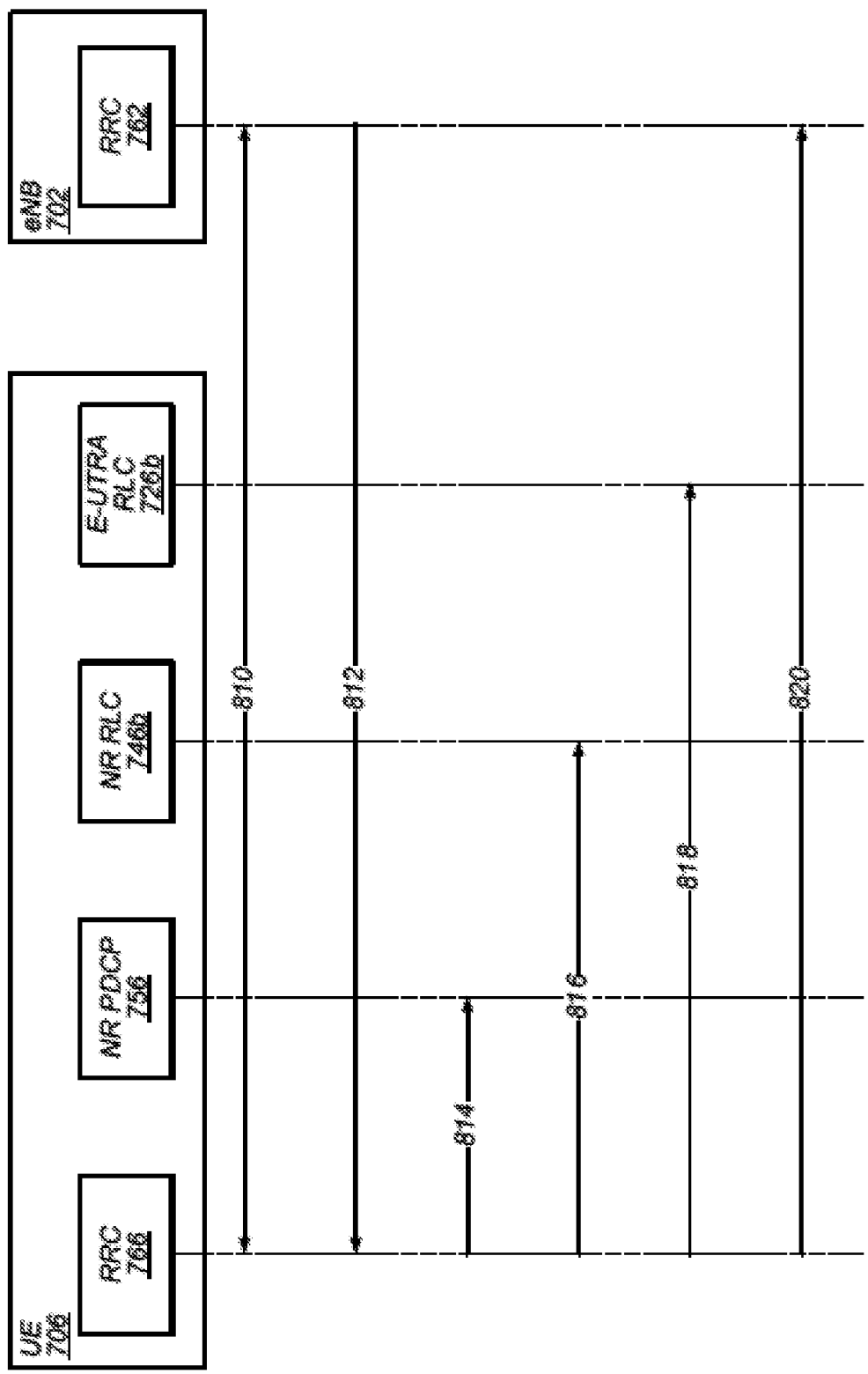
FIGS. 8-10 illustrate examples of signaling between a UE and network for UE configuration, according to embodiments.

For example, as shown if FIG. 8, a UE, such as UE 706, in an EN-DC configuration (e.g., as configured at 810) may receive an RRC configuration (or re-configuration) message 812 from a network entity (e.g., a master node, such as eNB 702). The RRC configuration message 812 may be transmitted from RRC layer 762 of eNB 702 and received at RRC layer 766 of UE 706. In some embodiments, the RRC configuration message 812 may include an information element (e.g., an OOD parameter as described above) indicating configuration of LTE side single layer re-ordering of data packets. In other words, the UE may be configured for out-of-order delivery of data packets from lower layers to upper layers (e.g., the UE may be configured to bypass standard LTE re-ordering functionality and in-order delivery guarantee at the RLC layer). Once the UE 706 receives the RRC configuration message 812 at the RRC layer 766, the RRC layer 766 may configure the NR PDCP layer 756, NR RLC layer 746*b*, and LTE (E-UTRA) RLC layer 726*b* of the UE 706, e.g., based on the received RRC configuration message 812. In particular, the RRC layer 766 may transmit a configuration message 814 to the NR PDCP layer 756 to configure the NR PDCP layer 756. Similarly, the RRC layer 766 may transmit a configuration message 816 to the NR RLC layer 746*b* to configure the NR RLC layer 746*b*. Further, the RRC layer 766 may transmit a configuration message 818 to the LTE RLC layer 726*b* to configure the LTE RLC layer 726*b*. In some embodiments, the configuration message 818 may include an RLC configuration parameter that may indicate that the LTE RLC layer 726*b* may bypass re-ordering and in-order delivery guarantee of data packets. In some embodiments, the RLC configuration parameter may be an OutOfOrderDelivery (OOD) parameter and the OutOfOrderDelivery may be set to "true" to indicate the configuration. The RRC layer 766 may then transmit an RRC configuration complete message 820 to the RRC layer 762 of eNB 702 to indicate that the configuration of the UE 702 is complete.

Figure 9:
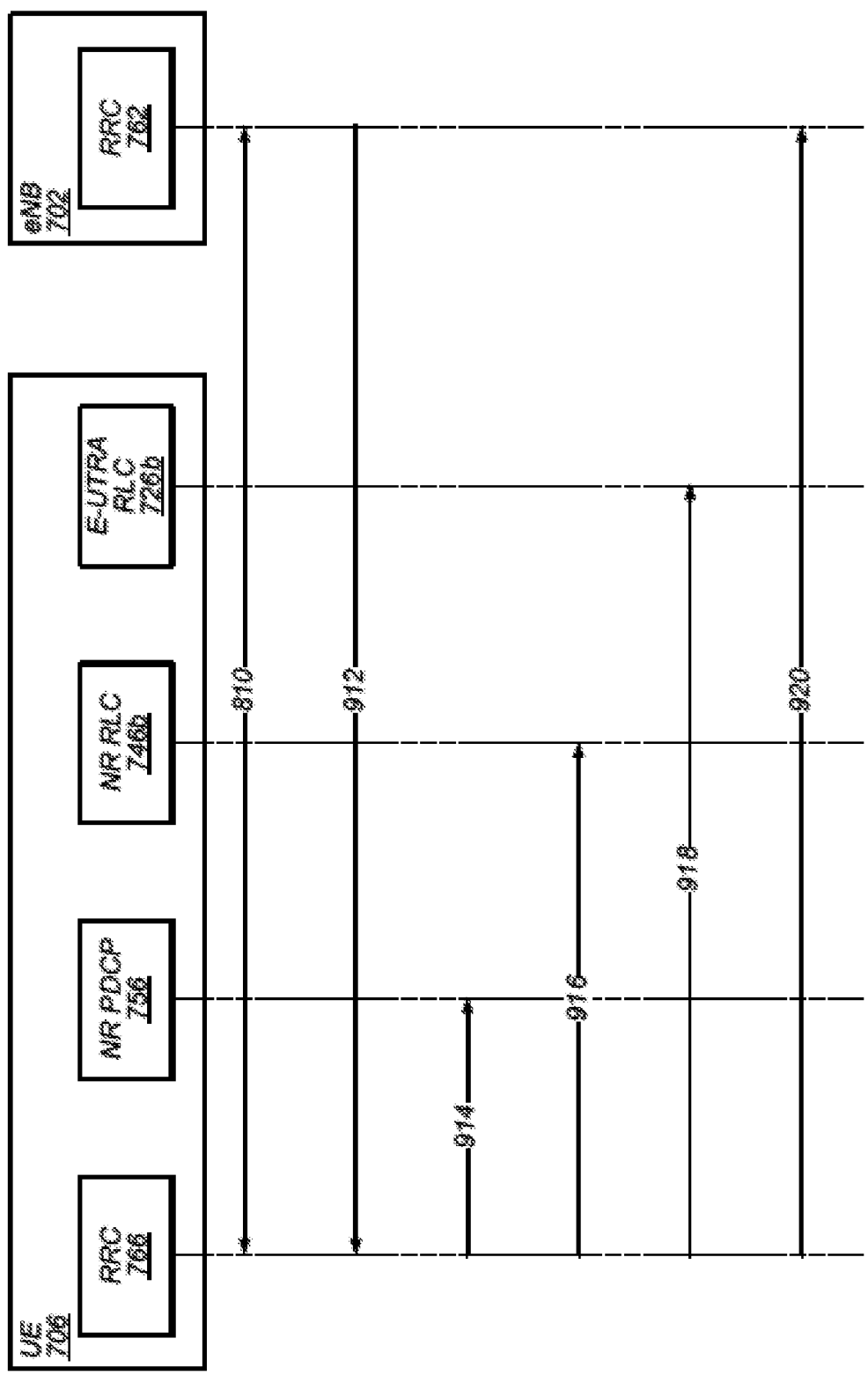

As a further example, as shown in FIG. 9, a UE, such as UE 706, in an EN-DC configuration (e.g., as configured at 810) may receive an RRC configuration (or re-configuration) message 912 from a network entity (e.g., a master node, such as eNB 702). The RRC configuration message 912 may be transmitted from RRC layer 762 of eNB 702 and received at RRC layer 766 of UE 706. In some embodiments, the RRC configuration message may not include an information element (e.g., an OOD parameter) indicating configuration LTE side single layer re-ordering of data packets. In other words, the UE may be configured for out-of-order delivery of data packets from lower layers to upper layers (e.g., the UE may be configured to bypass standard LTE re-ordering functionality and in-order delivery guarantee at the RLC layer). In other words, the RRC configuration message 912 may omit the information element indicating configuration of LTE side single layer re-ordering. Once the UE 706 receives the RRC configuration message 912 at the RRC layer 766, the RRC layer 766 may configure NR PDCP layer 756, NR RLC layer 746*b*, and LTE (E-UTRA) RLC layer 726*b* of the UE 706, e.g., based on the received RRC configuration message 812. In particular, the RRC layer 766 may transmit a configuration message 914 to the NR PDCP layer 756 to configure the NR PDCP layer 756. Similarly, the RRC layer 766 may transmit a configuration message 916 to the NR RLC layer 746*b* to configure the NR RLC layer 746*b*. Further, the RRC layer 766 may transmit a configuration message 918 to the LTE RLC layer 726b to configure the LTE RLC layer 726b. In some embodiments, the configuration message 918 may include an RLC configuration parameter that may indicate that the LTE RLC layer 726b may not bypass re-ordering and in-order delivery guarantee of data packets. In some embodiments, the RLC configuration parameter may be an OutOfOrderDelivery parameter and the OutOfOrderDelivery may be set to "false" to indicate the configuration. The RRC layer 766 may then transmit an RRC configuration complete message 920 to the RRC layer 762 of eNB 702 to indicate that the configuration of the UE 702 is complete.

In some embodiments, a LTE RLC AM layer paired with a NR PDCP layer may inherit an out-of-order delivery configuration (e.g., may bypass LTE re-ordering functionality and in-order delivery guarantee) based on the pairing with the NR PDCP layer. For example, the LTE RLC AM layer may be configured for out-of-order delivery if a reordering timer for the NR PDCP layer is set to "zero" and/or if an information element (e.g., OutOfOrderDelivery) of the NR PDCP layer is set to "configured". Alternatively, in some embodiments, if the reordering time for the NR PDCP layer is not set to "zero" and/or if the information element is not set to "configured", the LTE RLC AM layer may not be configured for out-of-order delivery and may default to legacy LTE behavior and guarantee in-order deliveries to higher layers. Note that in some embodiments, a UE may choose to enable and/or disable the LTE RLC layer's OutOfOrderDelivery feature, e.g., based, at least in part, on the UE's proprietary implementation of such a feature.

Figure 10:
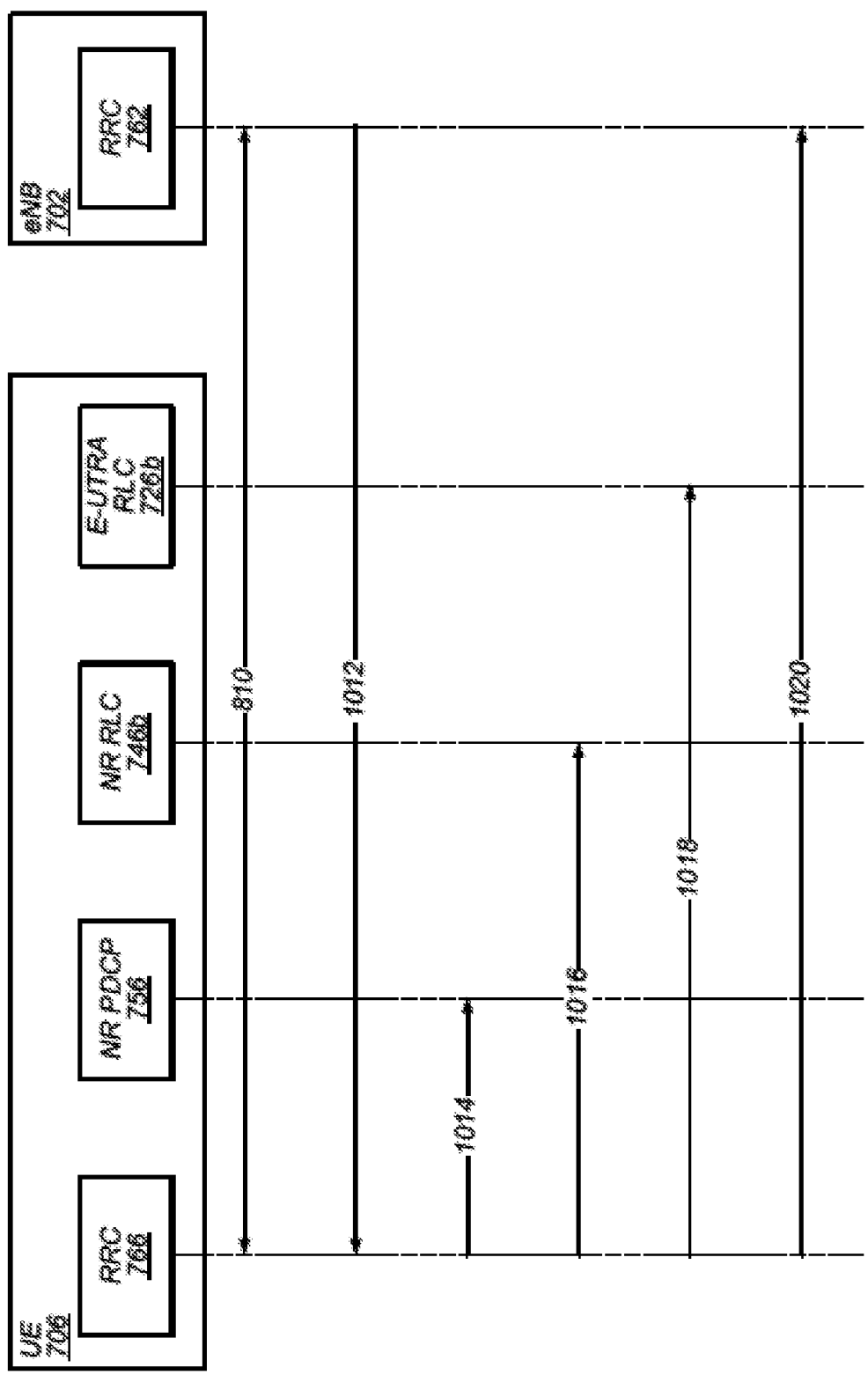

For example, as shown in FIG. 10, a UE, such as UE 706, in an EN-DC configuration (e.g., as configured at 810) may receive an RRC configuration (or re-configuration) message 1012 from a network entity (e.g., a master node, such as eNB 702). The RRC configuration message 1012 may be transmitted from RRC layer 762 of eNB 702 and received at RRC layer 766 of UE 706. In some embodiments, the RRC configuration message 1012 may include an information element (e.g., an OOD parameter as described above) indicating configuration of NR PDCP layer (or entity) 756 for out-of-order delivery of data packets. Once the UE 706 receives the RRC configuration message 1012 at the RRC layer 766, the RRC layer 766 may configure the NR PDCP layer 756, NR RLC layer 746b, and LTE (E-UTRA) RLC layer 726b of the UE 706, e.g., based on the received RRC configuration message 1012. In particular, the RRC layer 766 may transmit a configuration message 1014 to the NR PDCP layer 756 to configure the NR PDCP layer 756 for out-of-order delivery of data packets. Similarly, the RRC layer 766 may transmit a configuration message 1016 to the NR RLC layer 746b to configure the NR RLC layer 746b. Further, the RRC layer 766 may transmit a configuration message 1018 to the LTE RLC layer 726b to configure the LTE RLC layer 726b. In some embodiments, the configuration message 1018 may include an RLC configuration parameter that may indicate that the LTE RLC layer 726b may bypass re-ordering and in-order delivery guarantee of data packets. In some embodiments, the RLC configuration parameter may be an OutOfOrderDelivery parameter and the OutOfOrderDelivery may be set to "true" to indicate the configuration, e.g., based on the configuration of the NR PDCP layer 756. The RRC layer 766 may then transmit an RRC configuration complete message 1020 to the RRC layer 762 of eNB 702 to indicate that the configuration of the UE 702 is complete.

Note that although the above embodiments have been described with respect to EN-DC, out-of-order delivery functionality may also be implemented for LTE or LTE-DC. For example, out-of-order delivery functionality may be enabled/disabled at the RLC layer via LTE RRC signaling similar to the signaling described above in reference to FIGS. 8 and 9. Similarly, out-of-order delivery functionality may be enabled/disabled at the PDCP layer via LTE RRC signaling similar to the signaling described above in reference to FIG. 10.

Note further that there are various benefits achievable via any of the above described embodiments and/or any combination of the above described embodiments. For example, the embodiments (or combination of embodiments) described herein may avoid redundant re-ordering at multiple layers in a protocol stack (e.g., at NR PDCP and LTE RLC AM). In addition, asymmetrical layer 1 (e.g., usually "faster" NR-RLC/L1 and "slower" LTE-RLC/L1 or in case of LTE-DC, one LTE link may be "slower" or have "lower bandwidth" than the other LTE link) will no longer result in the faster link being constrained due to data arriving slower at the combined NR PDCP layer. Further, embodiments allow use of the out-of-order delivery functionality in NR PDCP layer at the LTE RLC AM layer, which may be critical to achieve lower latency and high speed data transfer. In other words, instead of LTE RLC AM layer guaranteeing in-order delivery to the NR PDCP layer, which may cause delays in delivery of data packets to the NR PDCP layer, the LTE RLC AM layer may be configured for out-of-order delivery of data packets to the NR PDCP layer. Additionally, apart from configuration of an information element parameter, e.g., such as an OutOfOrderDelivery parameter, there is no change from any RAN or CN network element perspective and absence of the configuration parameter may also imply legacy behavior, thereby providing a simple and backward compatible solution.

Note that in some embodiments, reconfiguration of the LTE RLC layer may impact standard operation of the LTE RLC layer. Thus, in some embodiments, when a LTE RLC acknowledged mode data (AMD) protocol data unit (PDU) with a sequence number (SN) equal to x is placed in a reception buffer, a receiving side of an AM RLC layer may:

(a) if any RLC service data unit(s) (SDU(s)) can be re-assembled from the payload received in SN x, re-assemble and deliver those RLC SDU(s) to upper layers (e.g., PDCP). Note that such an operation may be applied on RLC PDU and/or RLC PDU segment(s).

(b) if x==VR(MS) and all byte segments have been received, update the VR(MS) to the SN of the first AMD PDU with SN greater than current VR(MS) for which not all byte segments have been received, where VR(MS) refers to a maximum STATUS transmit state variable and holds a highest possible value of the SN which can be indicated by 'ACK_SN' when a STATUS PDU needs to be constructed. Note that VR(MS) may initially be set to zero.

(c) if x>=VR(H), update VR(H) to (x+1), where VR(H) refers to a highest received state variable and holds a value of the SN following the SN of the RLC data PDU with the highest SN among received RLC data PDUs. Note that VR(H) may initially be set to zero.

(d) update VR(R) to the SN of the first AMD PDU with SN>current VR(R) for which not all byte segments have been received, where VR(R) refers to a receive state variable and holds a value of the SN following the last in-sequence completely received AMD PDU and serves as the lower edge of the receiving window. Note that VR(R) may initially be set to zero and may be updated whenever the LTE AM RLC layer receives an AMD PDU with SN=VR(R).

(e) update VR(MR) to the updated VR(R)+AM_Window_Size, where VR(MR) refers to a maximum acceptable receive state variable and equals VR(R)+AM_Window_Size. Note that VR(MR) holds the value of the SN of the first AMD PDU that is beyond the receiving window and serves as the higher edge of the receiving window.

(f) update t-reordering timer value as per existing rules as specified in 3GPP TS 36.322.

Figure 11:
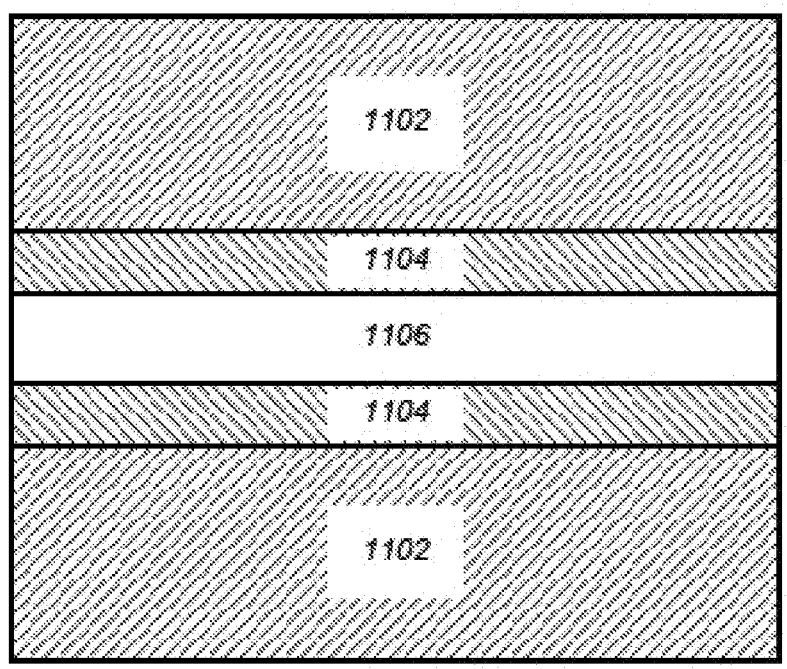
FIG. 11 illustrates an example RLC PDU, according to some embodiments.

In some embodiments, an LTE RLC layer may re-assemble and delivery RLC SDUs out of an RLC PDU that may not have been fully received and/or is out of order. For example, FIG. 11 illustrates an example RLC PDU, according to some embodiments. As shown, data 1102 may represent data not received, data 1104 may represent PDU bytes received, and data 1106 may represent a complete received RLC SDU. Thus, in some embodiments, RLC SDU may be re-assembled and delivered to higher layers even if it is received out of order. Note that according to 3GPP TS 36.322, RLC PUD may contain payload data comprising zero RLC SDU segments and one or more RLC SDUs or one or two RLC SDU segments and zero or more RLC SDUs, RLC SDUs. Additionally, RLC SDU segments may be mapped to the beginning or the end of the data field and when there are two RLC SDU segments, the RLC SDU segments may belong to different RLC SDUs.

Note that in some embodiments, if an out-of-order delivery configuration is enabled (e.g., prior to a re-establishment procedure), then an RLC AM downlink layer may not attempt to reassemble any RLC SDUs or deliver any RLC SDUs to upper layers.

In some embodiments, an alternative protocol stack at a UE, such as UE 106 and the network, may be implemented to support out-of-order delivery. For example, FIG. 12A illustrates an example protocol stack for a UE and FIG. 12B illustrates example protocol stacks for a master node and a secondary node, according to some embodiments.

Figure 12A:
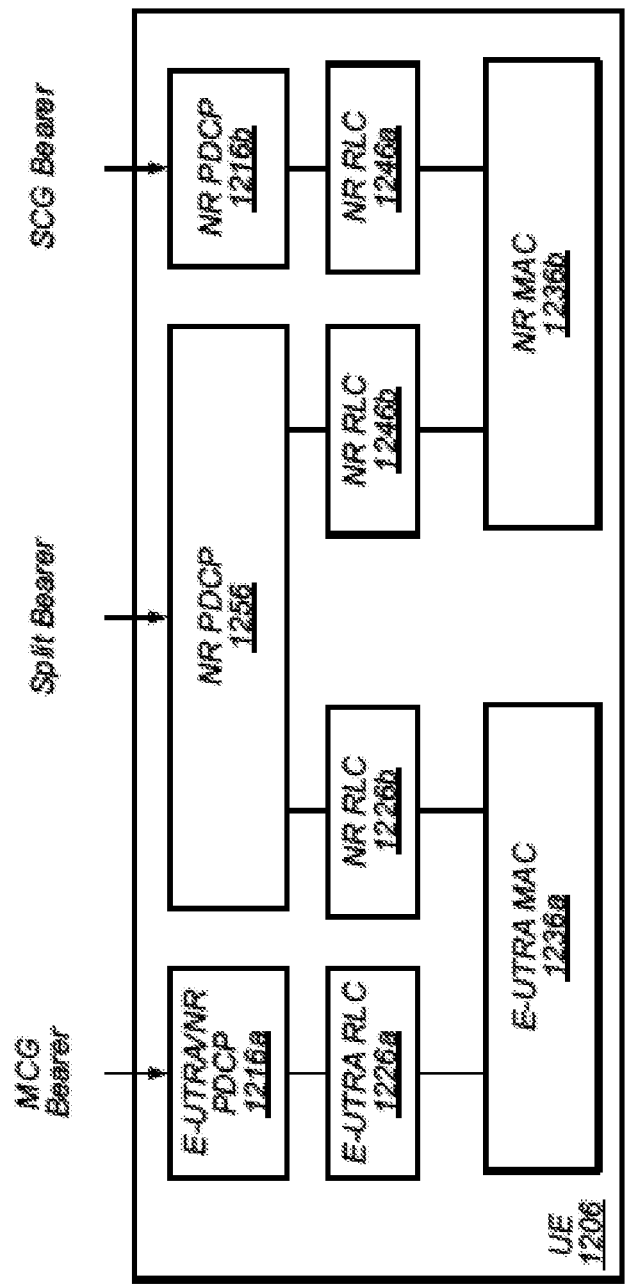
FIG. 12A illustrates an example configuration of a UE for dual connectivity, according to some embodiments.

As shown in FIG. 12A, a UE 1206 may include a E-UTRA (or E-UTRAN) medium access control (MAC) layer 1236a and an NR MAC layer 1236b. In addition, the E-UTRA MAC layer 1236a may interface with radio link control (RLC) layers 1226a-b. E-UTRA RLC layer 1226a may interface with E-UTRA/NR packet data convergence protocol (PDCP) layer 1216a which may communicate on the master cell group (MCG) bearer. NR MAC layer 1226b may interface with NR RLC layers 1246a-b. RLC layer 1246a may interface with NR PDCP layer 1216b which may communicate on the secondary cell group (SCG) bearer. Further, NR RLC layer 1226b and NR RLC layer 1246b may both interface with NR PDCP layer 1256 which may communicate on the split bearer.

Figure 12B:
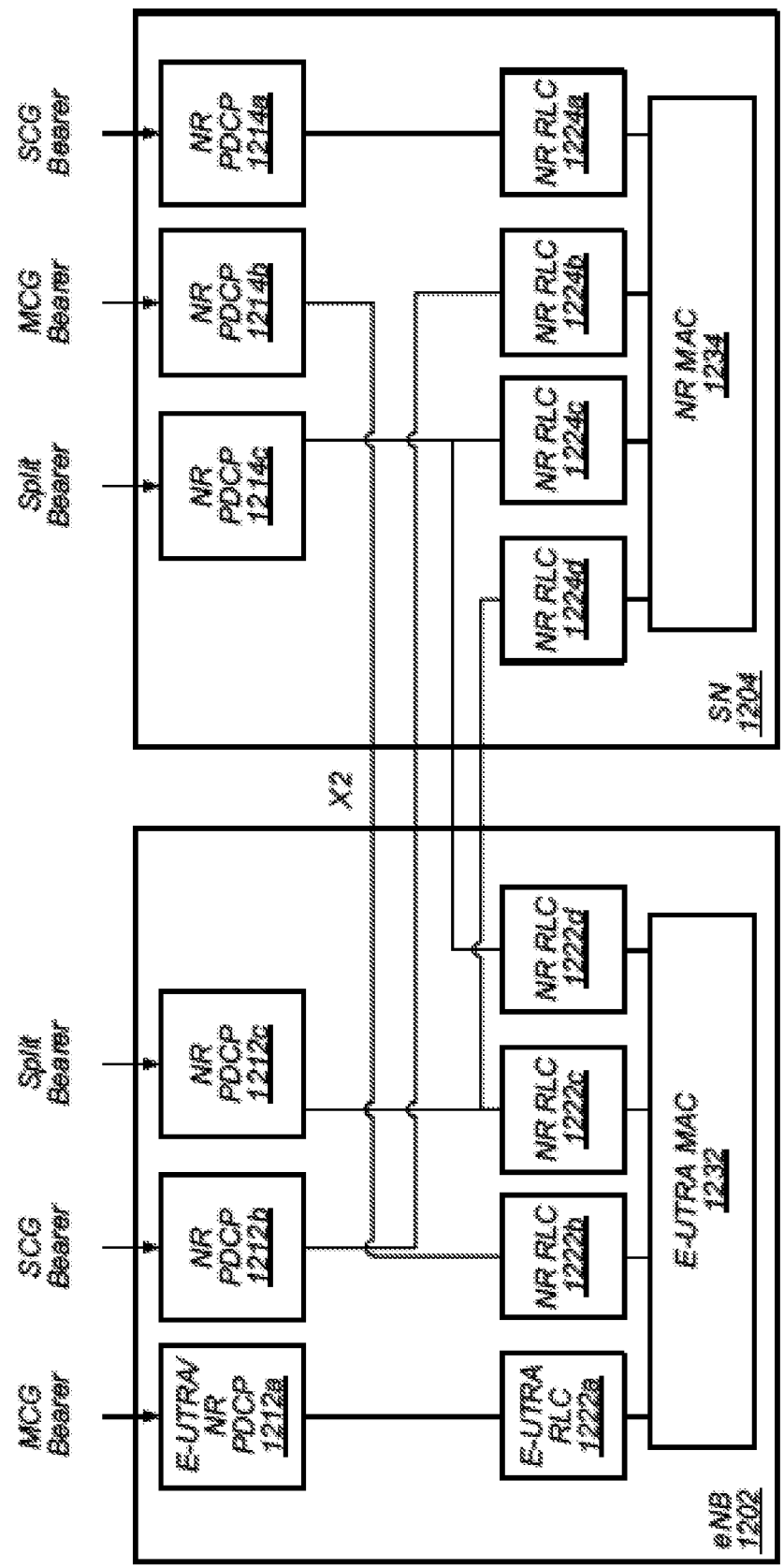
FIG. 12B illustrates another example of connections between an eNB and a gNB, according to some embodiments.

As shown in FIG. 12B, master node (MN) 1202 may include a MAC layer 1232 that interfaces with RLC layers 1222a-d. E-UTRA RLC layer 1222a may interface with PDCP layer 1212a which may communicate on the MCG bearer. NR RLC layer 1222c may interface with NR PDCP layer 1212c which may communicate on the split bearer. In other words, similar to dual connectivity as specified in LTE-Advanced Release 12, E-UTRA PDCP layer 1212a may interface via the MCG bearer to a core network whereas NR PDCP layer 1212c may interface via the split bearer with the core network.

Additionally, as shown, secondary node (SN) 1204 may include an NR MAC layer 1234 that interfaces with NR RLC layers 1224a-d. NR RLC layer 1224a may interface with NR PDCP layer 1214a which may communicate on the SCG bearer. In addition, NR RLC layer 1224c may interface with NR PDCP layer 1214c which may communicate on the split bearer. In other words, similar to dual connectivity as specified in LTE-Advanced Release 12, NR PDCP layer 1214a may interface via the SCG bearer to the core network whereas NR PDCP layer 1212c may interface via the split bearer with the core network.

In addition, MN 1202 and SN 1204 may interface via an $X_2$ interface for information exchange and/or coordination (e.g., scheduling of a UE) between MN 1202 and SN 1204. Thus, as shown, NR RLC layer 1222b may interface with NR PDCP layer 1214b which may communicate over the MCG bearer. Further, NR RLC layer 1222d may interface with NR PDCP layer 1212c which may communicate on the split bearer. Further, NR RLC layer 1224b may interface with NR PDCP layer 1212b which may also communicate on the SCG bearer. Similarly, NR RLC layer 1224d may interface with NR PDCP layer 1212c which may communicate on the SCG bearer. In some scenarios, a UE may be required to maintain a connection to both an MN and a SN. In such scenarios, the MN may be used to maintain a radio resource control (RRC) connection to a core while the SN may be used for capacity (e.g., additional downlink and/or uplink throughput).

Thus, since NR RLC AM supports out-of-order delivery along with at most one RLC SDU/RLC PDU, the embodiments described above in reference to FIGS. 12A-B allows for LTE out-of-order delivery. Further, the embodiments described above in reference to FIGS. 12A-B achieve the goal of avoiding a data "bottleneck" on the LTE leg of the split bearer, even if an NR RLC layer is stacked atop a "slower" and/or "lower bandwidth" E-UTRA MAC layer. Such a configuration may aid in achievement of lower latency and higher throughput as compared to legacy LTE EN-DC configurations.

Figure 13:
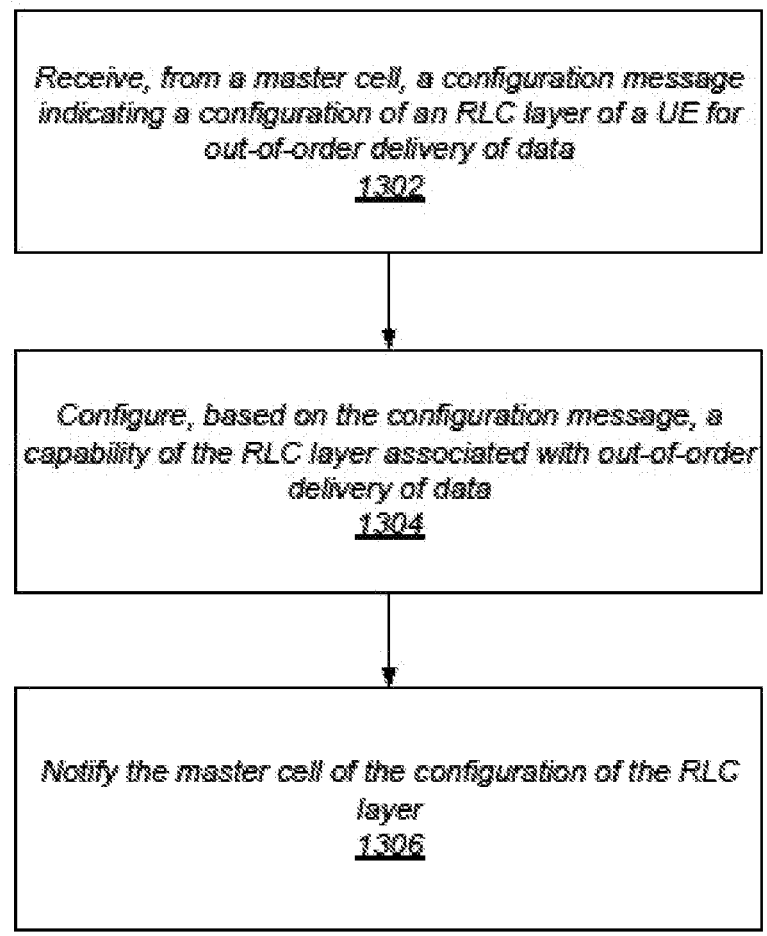
FIG. 13 illustrates a block diagram of an example of a method for configuring an RLC layer of a protocol stack of a UE for out-of-order delivery of data units, according to some embodiments.

FIG. 13 illustrates a block diagram of an example of a method for configuring an RLC layer of a protocol stack of a UE for out-of-order delivery of data units, according to some embodiments. The method shown in FIG. 13 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1302, a configuration message indicating a configuration of a radio link control (RLC) layer of a UE for out-of-order delivery of data units may be received from a master cell. In some embodiments, the UE may be (or have been) configured via radio resource control (RRC) signaling for dual connectivity with a master cell and a secondary cell. For example, the UE may (or may be configured to) receive, from the master cell, the configuration message, where the configuration message indicates a configuration of the UE for out-of-order delivery of data units from the RLC layer of the first protocol stack implemented on the UE. Note that in some embodiments, prior to receiving the configuration message, the UE may notify the master cell (e.g., via an RRC message), that the UE is capable of supporting OutOfOrderDelivery of data packets from the RLC layer to higher layers. In addition, in some embodiments, the RLC layer may be one of a plurality of RLC layers of a first protocol stack and may be paired with a packet data control protocol (PDCP) layer of a second protocol stack. In some embodiments, the PDCP layer of the second protocol stack may be one of a plurality of PDCP layers of the second protocol stack. In some embodiments, the first protocol stack may be associated with a first RAT and the second protocol stack may be associated with a second RAT. In some embodiments, the master cell may be configured to operate according to the first RAT and the secondary cell may be configured to operate according to the second RAT. In some embodiments, the first RAT and the second RAT may be different, e.g., LTE and 5G NR. In some embodiments, the second RAT may be a variation of the first RAT, e.g., LTE and LTE supporting HRLLC.

At 1304, a capability of the RLC layer associated with out-of-order delivery of data may be configured. For example, the UE may (or may be configured to) configure a first capability of the RLC layer of the first protocol stack based on the configuration message, where the first capability is associated with out-of-order delivery of data units transmitted from the RLC layer. In some embodiments, configuring the (first) capability of the RLC layer may include determining, based (at least in part) on the configuration message, that either the RLC layer of the first protocol stack should be configured for out-of-order delivery of data units; a PDCP layer of the second protocol stack paired with the RLC layer of the first protocol stack should be configured for out-of-order delivery of data units; or the RLC layer of the first protocol stack should not be configured for out-of-order delivery of data units. In some embodiments, in response to determining that the RLC layer of the first protocol stack should be configured for out-of-order delivery of data units, a radio resource control (RRC) layer of the first protocol stack may transmit a first RRC configuration message to the RLC layer of the first protocol stack indicating out-of-order delivery of data units transmitted from the RLC layer. In some embodiments, in response to determining that the RLC layer of the first protocol stack should not be configured for out-of-order delivery of data units, the RRC layer of the first protocol stack may transmit a second RRC configuration message to the RLC layer of the first protocol stack indicating in-order delivery of data units transmitted from the RLC layer.

In some embodiments, determining, based on the configuration message, that the RLC layer of the first protocol stack should be configured for out-of-order delivery of data units may include determining that the configuration message includes a parameter associated with configuration of the RLC layer of the first protocol stack for out-of-order delivery of data units transmitted from the RLC layer and determining, based on a value of the parameter, that the RLC layer of the first protocol stack should be configured for out-of-order delivery of data units. For example, if the value of the parameter is "1" or "true", the RLC layer of the first protocol stack may be configured for out-of-order delivery of data units. In contrast, if the value of the parameter is "0" or "false", the RLC layer of the first protocol stack may not be configured for out-of-order delivery of data units.

In some embodiments, determining, based on the configuration message, that the PDCP layer of the second protocol stack paired with the RLC layer of the first protocol stack should be configured for out-of-order delivery of data units, may include determining that the configuration message includes a parameter associated with configuration of the PDCP layer of the second protocol stack for out-of-order delivery of data units transmitted from the PDCP layer and determining, based on a value of the parameter, that the RLC layer of the first protocol stack should be configured for out-of-order delivery of data units. For example, if the value of the parameter is "1" or "true", the RLC layer of the first protocol stack may be configured for out-of-order delivery of data units. In contrast, if the value of the parameter is "0" or "false", the RLC layer of the first protocol stack may not be configured for out-of-order delivery of data units.

In some embodiments, determining, based on the configuration message, that the RLC layer of the first protocol stack should not be configured for out-of-order delivery of data units, may include determining that the configuration message does not include a first parameter associated with configuration of the RLC layer of the first protocol stack for out-of-order delivery of data units transmitted from the RLC layer or a second parameter associated with configuration of the PDCP layer of the second protocol stack for out-of-order delivery of data units transmitted from the PDCP layer and determining, based on an absence of the first parameter and the second parameter, that the RLC layer of the first protocol stack should be configured for in-order delivery of data units. For example, if the configuration message does not include a parameter associated with configuration of the RLC layer for out-of-order delivery of data units, the RLC layer may then be configured for in-order delivery of data units based on the omission of the parameter from the configuration message.

At 1306, the master cell may be notified of the configuration of the RLC layer of the first protocol stack. In other words, the UE may transmit an RRC message to the master cell confirming the configuration (or re-configuration) of the RLC layer of the first protocol stack. In some embodiments, a downlink (DL) schedule for receiving transmissions from the master cell and the secondary cell may be received from the master cell. In some embodiments, the downlink schedule may be based, at least in part, on the configuration of the RLC layer. In other words, in some embodiments, DL scheduling may be based, at least in part, on the RLC layer of the first protocol stack being configured for out-of-order delivery of data units (or packets) to higher layers, such as the PDCP layer of the second protocol stack.

Figure 14:
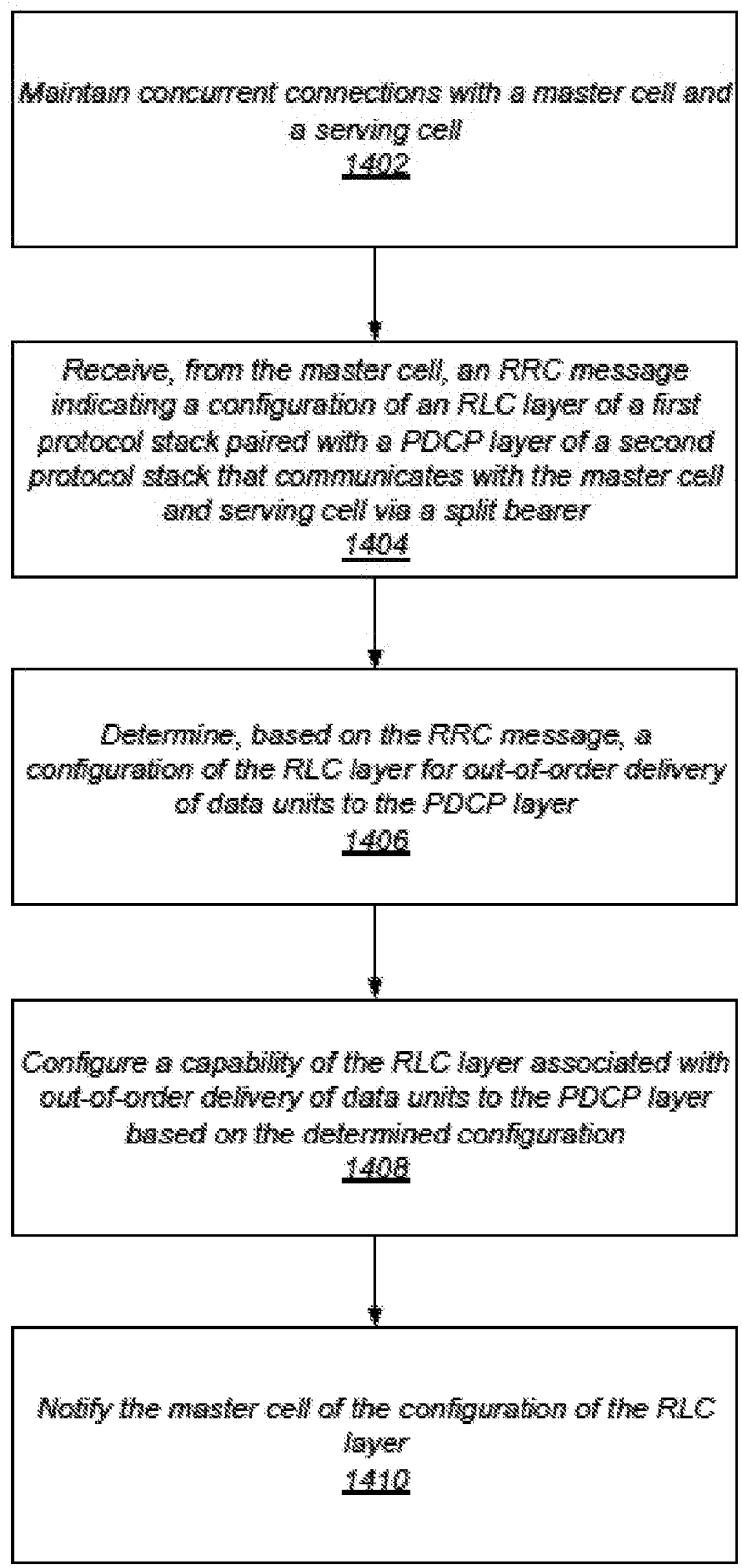
FIG. 14 illustrates a block diagram of another example of a method for configuring an RLC layer of a protocol stack of a UE for out-of-order delivery of data units, according to some embodiments.

FIG. 14 illustrates a block diagram of another example of a method for configuring an RLC layer of a protocol stack of a UE for out-of-order delivery of data units, according to some embodiments. The method shown in FIG. 14 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1402, substantially concurrent connections may be maintained with a master cell configured to operate according to a first RAT and a secondary cell configured to operate according a second RAT. For example, in some embodiments, the UE may be (or have been) configured via radio resource control (RRC) signaling for dual connectivity with the master cell and the secondary cell. In some embodiments, the first RAT and the second RAT may be different, e.g., LTE and 5G NR. In some embodiments, the second RAT may be a variation of the first RAT, e.g., LTE and LTE supporting HRLLC.

At 1404, an RRC message indicating configuration of a radio link control (RLC) layer of the first protocol stack paired with a packet data control protocol (PDCP) layer of the second protocol stack may be received from the master cell. In some embodiments, the PDCP layer of the second protocol stack may be configured to communicate with the master cell and the secondary cell via a split bearer. Note that in some embodiments, prior to receiving the RRC message, the UE may notify the master cell (e.g., via an RRC message), that the UE is capable of supporting OutOfOrderDelivery of data packets from the RLC layer to higher layers.

At 1406, a configuration of the RLC layer of the first protocol stack for out-of-order delivery of data packets to the PDCP layer of the second protocol stack may be determined based on the RRC message. In some embodiments, determining the configuration may include determining that the RLC layer of the first protocol stack should be configured for out-of-order delivery of data packets, the PDCP layer of the second protocol stack should be configured for out-of-order delivery of data packets, or the RLC layer of the first protocol stack should not be configured for out-of-order delivery of data packets.

In some embodiments, determining that the RLC layer of the first protocol stack should be configured for out-of-order delivery of data packets may include determining that the RRC message includes a parameter associated with configuration of the RLC layer of the first protocol stack for out-of-order delivery of data packets to the PDCP layer of the second protocol stack and determining, based on a value of the parameter, that the RLC layer of the first protocol stack should be configured for out-of-order delivery of data packets to the PDCP layer of the second protocol stack.

In some embodiments, determining that the PDCP layer of the second protocol should be configured for out-of-order delivery of data packets to the split bearer, may include determining that the RRC message includes a parameter associated with configuration of the PDCP layer of the second protocol stack for out-of-order delivery of data to the split bearer and determining, based on a value of the parameter, that the RLC layer of the first protocol stack should be configured for out-of-order delivery of data packets to the PDCP layer of the second protocol stack.

In some embodiments, determining that the RLC layer of the first protocol stack should not be configured for out-of-order delivery of data packets may include determining that the RRC message does not include a first parameter associated with configuration of the RLC layer of the first protocol stack for out-of-order delivery of data packets or a second parameter associated with configuration of the PDCP layer of the second protocol stack for out-of-order delivery of data packets and determining, based on an absence of the first parameter and the second parameter, that the RLC layer of the first protocol stack should be configured for in-order delivery of data packets to the PDCP layer of the second protocol stack.

At 1408, a capability of the RLC layer of the first protocol stack associated with out-of-order-delivery of data packets to the PDCP layer of the second protocol stack based on the determined configuration may be configured.

At 1410, the master cell may be notified of the configuration of the RLC layer of the first protocol stack. In other words, the UE may transmit an RRC message to the master cell confirming the configuration (or re-configuration) of the RLC layer of the first protocol stack. In some embodiments, a downlink (DL) schedule for receiving transmissions from the master cell and the secondary cell may be received from the master cell. In some embodiments, the downlink schedule may be based, at least in part, on the configuration of the RLC layer. In other words, in some embodiments, DL scheduling may be based, at least in part, on the RLC layer of the first protocol stack being configured for out-of-order delivery of data units (or packets) to higher layers, such as the PDCP layer of the second protocol stack.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the UE is configured via radio resource control (RRC) signaling for dual connectivity with a primary cell and a secondary cell, and wherein the one or more processors are configured to cause the UE to:
receive, from the primary cell, a configuration message, wherein the configuration message indicates a configuration of the UE for out-of-order delivery of data units from a radio link control (RLC) layer of a first protocol stack implemented on the UE;
configure a first capability of the RLC layer of the first protocol stack based on the configuration message, wherein the first capability is associated with out-of-order delivery of data units transmitted from the RLC layer;
configure, based on the configuration message, a second capability of a packet data control protocol (PDCP) layer of a second protocol stack paired with the RLC layer of the first protocol stack, wherein the second capability is associated with out-of-order of delivery of data units transmitted from the PDCP layer;
notify the primary cell of the configuration of the RLC layer; and
receive, from the primary cell, a downlink schedule for receiving transmissions from the primary cell and the secondary cell, wherein the downlink schedule is based, at least in part, on the configuration of the RLC layer.

2. The UE of claim 1,
wherein the primary cell operates according to a first RAT associated with the first protocol stack, and wherein the secondary cell operates according to a second RAT associated with a second protocol stack.

3. The UE of claim 2,
wherein the first RAT is Long Term Evolution (LTE); and
wherein the second RAT is one of 5G New Radio (5G NR) or LTE high reliability low latency communication (HRLLC).

4. The UE of claim 1,
wherein, to configure the first capability of the RLC layer of the first protocol stack, the one or more processors are further configured to:
  determine, based on the configuration message, that one of:
    the RLC layer of the first protocol stack should be configured for out-of-order delivery of data units; or
    the RLC layer of the first protocol stack should not be configured for out-of-order delivery of data units; and
  wherein, in response to determining that the RLC layer of the first protocol stack should be configured for out-of-order delivery of data units, the one or more processors are further configured to cause the UE to transmit, from an RRC layer of the first protocol stack, a first RRC configuration message to the RLC layer of the first protocol stack indicating out-of-order delivery of data units transmitted from the RLC layer; and
  wherein, in response to determining that the RLC layer of the first protocol stack should not be configured for out-of-order delivery of data units, the one or more processors are further configured to cause the UE to transmit, from the RRC layer of the first protocol stack, a second RRC configuration message to the RLC layer of the first protocol stack indicating in-order delivery of data units transmitted from the RLC layer.

5. The UE of claim 4,
wherein, to determine, based on the configuration message, that the RLC layer of the first protocol stack should be configured for out-of-order delivery of data units, the one or more processors are further configured to cause the UE to:
  determine that the configuration message includes a parameter associated with configuration of the RLC layer of the first protocol stack for out-of-order delivery of data units transmitted from the RLC layer; and
  determine, based on a value of the parameter, that the RLC layer of the first protocol stack should be configured for out-of-order delivery of data units.

6. The UE of claim 4,
wherein, to determine, based on the configuration message, that the PDCP layer of the second protocol stack paired with the RLC layer of the first protocol stack should be configured for out-of-order delivery of data units, the one or more processors are further configured to cause the UE to:
  determine that the configuration message includes a parameter associated with configuration of the PDCP layer of the second protocol stack for out-of-order delivery of data units transmitted from the PDCP layer; and
  determine, based on a value of the parameter, that the RLC layer of the first protocol stack should be configured for out-of-order delivery of data units.

7. The UE of claim 4,
wherein, to determine, based on the configuration message, that the RLC layer of the first protocol stack should not be configured for out-of-order delivery of data units, the one or more processors are further configured to cause the UE to:
  determine that the configuration message does not include a first parameter associated with configuration of the RLC layer of the first protocol stack for out-of-order delivery of data units transmitted from the RLC layer or a second parameter associated with configuration of the PDCP layer of the second protocol stack for out-of-order delivery of data units transmitted from the PDCP layer; and
  determine, based on an absence of the first parameter and the second parameter, that the RLC layer of the first protocol stack should be configured for in-order delivery of data units.

8. An apparatus, comprising:
a memory, wherein the memory comprises instructions for implementing a first protocol stack associated with a first radio access technology (RAT) and a second protocol stack associated with a second RAT; and
at least one processor in communication with the memory, wherein the at least one processor is configured to:
  maintain substantially concurrent connections with a primary cell configured to operate according to the first RAT and a secondary cell configured to operate according the second RAT;
  receive, from the primary cell, a radio resource control (RRC) message indicating configuration of a radio link control (RLC) layer of the first protocol stack paired with a packet data control protocol (PDCP) layer of the second protocol stack, wherein the PDCP layer of the second protocol stack is configured to communicate with the primary cell and the secondary cell via a split bearer; and
  determine, based on the RRC message, a configuration of the RLC layer of the first protocol stack for out-of-order delivery of data packets to the PDCP layer of the second protocol stack;
  configure a capability of the RLC layer of the first protocol stack associated with out-of-order-delivery of data packets to the PDCP layer of the second protocol stack based on the determined configuration;
  configure a second capability of the PDCP layer of the second protocol stack paired with the RLC layer of the first protocol stack, wherein the second capability is associated with out-of-order of delivery of data units transmitted from the PDCP layer;
  generate instructions to notify the primary cell of the configuration of the RLC layer of the first protocol stack; and
  receive, from the primary cell, a downlink schedule for receiving transmissions from the primary cell and the secondary cell, wherein the downlink schedule is based, at least in part, on the configuration of the RLC layer of the first protocol stack.

9. The apparatus of claim 8,
wherein the first RAT is Long Term Evolution (LTE); and
wherein the second RAT is one of 5G New Radio (5G NR) or LTE supporting high reliability low latency communication (HRLLC).

10. The apparatus of claim 8,
wherein, to determine, based on the RRC message, the configuration of the RLC layer of the first protocol stack for out-of-order delivery of data packets to the PDCP layer of the second protocol stack, the at least one processor is further configured to:
  determine, based on the RRC message, that one of:
    the RLC layer of the first protocol stack should be configured for out-of-order delivery of data packets; or
    the RLC layer of the first protocol stack should not be configured for out-of-order delivery of data packets.

11. The apparatus of claim 10,
wherein, to determine, based on the RRC message, that the RLC layer of the first protocol stack should be configured for out-of-order delivery of data packets, the at least one processor is further configured to:
  determine that the RRC message includes a parameter associated with configuration of the RLC layer of the first protocol stack for out-of-order delivery of data packets to the PDCP layer of the second protocol stack; and
  determine, based on a value of the parameter, that the RLC layer of the first protocol stack should be configured for out-of-order delivery of data packets to the PDCP layer of the second protocol stack.

12. The apparatus of claim 10,
wherein, to determine, based on the RRC message, that the PDCP layer of the second protocol should be configured for out-of-order delivery of data packets to the split bearer, the at least one processor is further configured to:
  determine that the RRC message includes a parameter associated with configuration of the PDCP layer of the second protocol stack for out-of-order delivery of data to the split bearer; and
  determine, based on a value of the parameter, that the RLC layer of the first protocol stack should be configured for out-of-order delivery of data packets to the PDCP layer of the second protocol stack.

13. The apparatus of claim 10,
wherein, to determine, based on the RRC message, that the RLC layer of the first protocol stack should not be configured for out-of-order delivery of data packets, the at least one processor are further configured to:
  determine that the RRC message does not include a first parameter associated with configuration of the RLC layer of the first protocol stack for out-of-order delivery of data packets or a second parameter associated with configuration of the PDCP layer of the second protocol stack for out-of-order delivery of data packets; and
  determine, based on an absence of the first parameter and the second parameter, that the RLC layer of the first protocol stack should be configured for in-order delivery of data packets to the PDCP layer of the second protocol stack.

14. A non-transitory computer readable memory medium storing program instructions executable by processing circuitry to cause a user equipment device (UE) to:
  maintain concurrent connections with a primary cell configured to operate according to a first radio access technology (RAT) and a secondary cell configured to operate according the second RAT;
  receive, from the primary cell, a configuration message, wherein the configuration message indicates a configuration of a radio link control (RLC) layer of a first protocol stack implemented on the UE, wherein the configuration is associated with out-of-order delivery of data units transmitted from the RLC layer to a packet data control protocol (PDCP) layer of a second protocol stack implemented on the UE, wherein the RLC layer is paired to the PDCP layer, and wherein the PDCP layer communicates with the primary cell and the secondary cell via a split bearer;
  configure a first capability of the RLC layer of the first protocol stack based the configuration message, wherein the first capability is associated with out-of-order delivery of data units from the RLC layer to the PDCP layer;
  configure a second capability of the PDCP layer of the second protocol stack paired with the RLC layer of the first protocol stack, wherein the second capability is associated with out-of-order of delivery of data units transmitted from the PDCP layer;
  notify the primary cell of the configuration of the RLC layer;
  receive, from the primary cell, a downlink schedule for receiving transmissions from the primary cell and the secondary cell, wherein the downlink schedule is based, at least in part, on the configuration of the RLC layer of the first protocol stack.

15. The non-transitory computer readable memory medium of claim 14,
wherein, to configure the first capability of the RLC layer of the first protocol stack, the program instructions are further executable to:
  determine, based on the configuration message, that one of:
    the RLC layer of the first protocol stack should be configured for out-of-order delivery of data units; or
    the RLC layer of the first protocol stack should not be configured for out-of-order delivery of data units; and
  wherein, in response to determining that the RLC layer of the first protocol stack should be configured for out-of-order delivery of data units, the program instructions are further executable to configure the RLC layer of the first protocol stack for out-of-order delivery of data units to the PDCP layer of the second protocol stack; and
  wherein, in response to determining that the RLC layer of the first protocol stack should not be configured for out-of-order delivery of data units, the program instructions are further executable to configure the RLC layer of the first protocol stack for in-order delivery of data units to the PDCP layer of the second protocol stack.

16. The non-transitory computer readable memory medium of claim 15,
wherein, to determine, based on the configuration message, that the RLC layer of the first protocol stack should be configured for out-of-order delivery of data units to the PDCP layer of the second protocol stack, the program instructions are further executable to:

determine that the configuration message includes a parameter associated with configuration of the RLC layer of the first protocol stack for out-of-order delivery of data units to the PDCP layer of the second protocol stack; and determine, based on a value of the parameter, that the RLC layer of the first protocol stack should be configured for out-of-order delivery of data units to the PDCP layer of the second protocol stack.

17. The non-transitory computer readable memory medium of claim 15, wherein, to determine, based on the configuration message, that the PDCP layer of the second protocol should be configured for out-of-order delivery of data units via the split bearer, the program instructions are further executable to:

determine that the configuration message includes a parameter associated with configuration of the PDCP layer of the second protocol stack for out-of-order delivery of data via the split bearer; and determine, based on a value of the parameter, that the RLC layer of the first protocol stack should be configured for out-of-order delivery of data units to the PDCP layer of the second protocol stack.

18. The non-transitory computer readable memory medium of claim 15, wherein, to determine, based on the configuration message, that the RLC layer of the first protocol stack should not be configured for out-of-order delivery of data units to the PDCP layer of the second protocol stack, the program instructions are further executable to:

determine that the configuration message does not include a first parameter associated with configuration of the RLC layer of the first protocol stack for out-of-order delivery of data units or a second parameter associated with configuration of the PDCP layer of the second protocol stack for out-of-order delivery of data units; and determine, based on an absence of the first parameter and the second parameter, that the RLC layer of the first protocol stack should be configured for in-order delivery of data units to the PDCP layer of the second protocol stack.

19. The non-transitory computer readable memory medium of claim 14, wherein the first RAT is Long Term Evolution (LTE).

20. The non-transitory computer readable memory medium of claim 19, wherein the second RAT is one of 5G New Radio (5G NR) or LTE supporting high reliability low latency communication (HRLLC).

* * * * *

UNITED STATES PATENT AND TRADEMARK OFFICE
CERTIFICATE OF CORRECTION

| | |
|---|---|
| PATENT NO. | : 11,596,016 B2 |
| APPLICATION NO. | : 16/336456 |
| DATED | : February 28, 2023 |
| INVENTOR(S) | : Dawei Zhang et al. |

It is certified that error appears in the above-identified patent and that said Letters Patent is hereby corrected as shown below:

In the Claims

Column 30, Line 28, delete "layer;" and substitute --layer; and--.

Signed and Sealed this
Nineteenth Day of December, 2023

*Katherine Kelly Vidal*

Katherine Kelly Vidal
*Director of the United States Patent and Trademark Office*